April 7, 1953 P. G. M. BARRIS 2,633,716
APPARATUS FOR OBTAINING MASSES OF THERMAL ENERGY
Filed Feb. 5, 1948
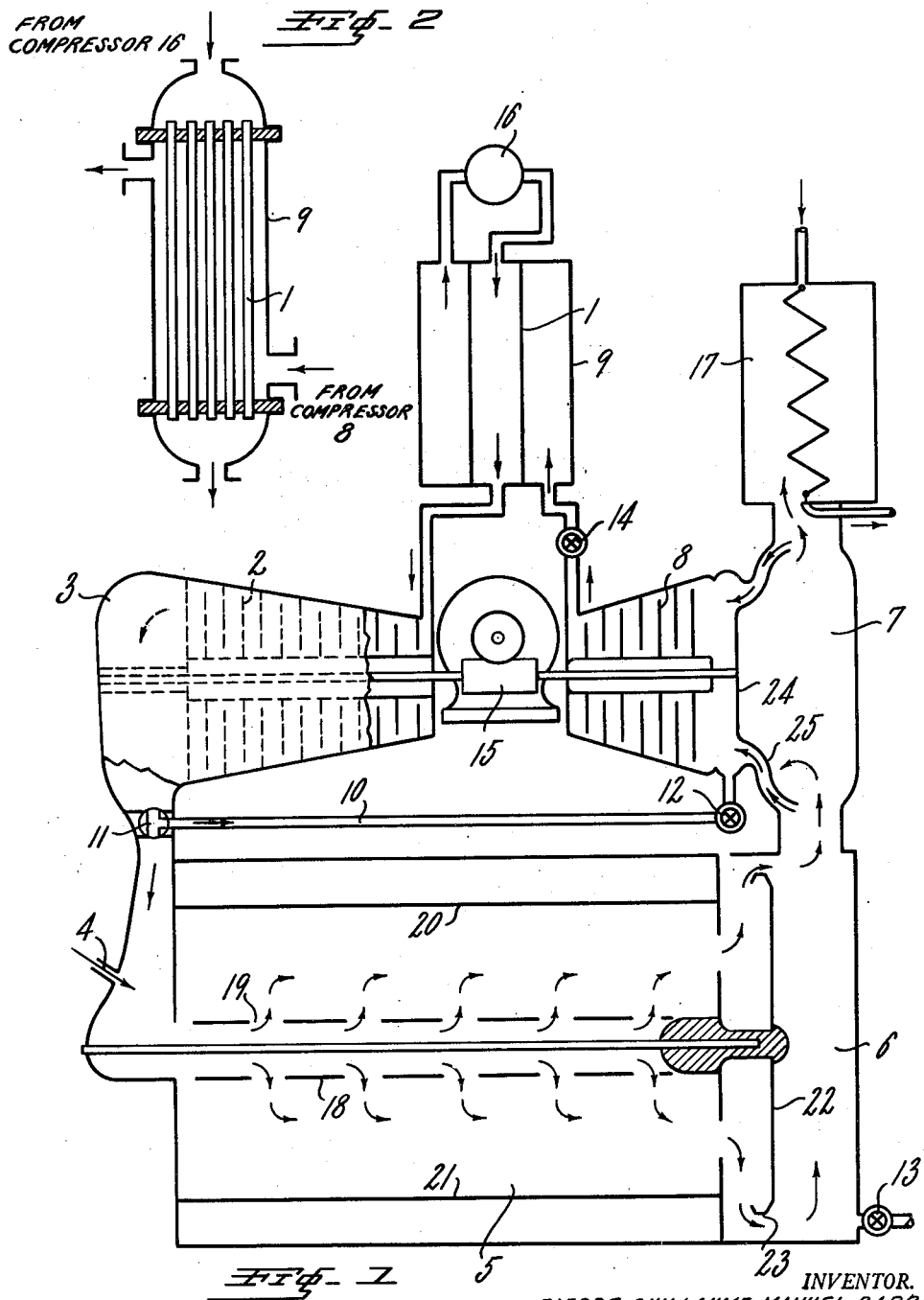
INVENTOR.
PIERRE GUILLAUME MANUEL BARRIS Patented Apr. 7, 1953

2,633,716

UNITED STATES PATENT OFFICE 2,633,716

APPARATUS FOR OBTAINING MASSES OF THERMAL ENERGY

Pierre Guillaume Manuel Barris, Paris, France

Application February 5, 1948, Serial No. 6,515
In France February 10, 1947

3 Claims. (Cl. 62—114)

This invention relates to an apparatus for obtaining masses of thermal energy. For subjecting various products or masses to a given temperature and for keeping them at this temperature, for instance for maintaining foodstuff in a condition of precongelation or congelation, bodies such as ice, solid carbon dioxide (Dry Ice), etc. are currently used which when they are brought in contact, directly or indirectly, with said foodstuff, constitute a thermal source with a large storage of energy (in the present example a source of refrigeration) which through thermal exchange with the treated product, bring the latter down to the desired temperature and keep it at that temperature for a certain length of time.

The number of bodies or masses used to obtain a suitable thermal source of energy is very limited and as a consequence thereof the temperatures at which the thermal capacity of these bodies can be used are also limited.

One of the objects of the invention is to provide an apparatus for obtaining at a given temperature masses constituting sources of thermal energy whereby the possibilities of the use of the temperatures and thermal capacities of the said masses are considerably expanded, use being made of bodies which heretofore did not constitute such sources.

A further object of the invention resides in providing an apparatus for simplified and efficient construction for producing masses of thermal energy.

This apparatus operates so that the body selected for the thermal mass is finely divided and constitutes particles which are introduced in a fluid carried at a temperature which latter is a function of the required temperature, the introduced particles being then extracted or removed rapidly from said fluid for forming the mass which constitutes the thermal source.

The thermal exchange between the fluid and the body introduced is nearly instantaneous and is effected without any appreciable thermal loss.

According to the invention masses are obtained which constitute thermal sources at a very low temperature, particularly for the purpose of precongealing or congealing foodstuffs, fish for instance, by wrapping up the said stuff rapidly in a shell which contains a stored refrigerant required for bringing the body to the required temperature and keeping it at that temperature for a certain length of time, according to the French Patent No. 529,597 and French Patent of Addition No. 44,383, of applicant, entitled "Process and apparatus for conveying to an object a predetermined thermal condition, particularly for precongealing foodstuffs."

A particular embodiment of the apparatus is hereinafter described in greater detail.

In the drawings:

Figure 1 is a diagrammatic view of the apparatus.

Figure 2 is a detailed vertical sectional view of the condenser of Figure 1.

In this apparatus one introduces in the draught of a gas a liquid such as water, syrup, brine, atomized at the size of the order of the micron or gas easily liquefiable or congealable such as carbonic anhydride, or a solid such as a metal in the form of impalpable powder, either alone or mixed, the speed of the said draught of gas being preferably very high, for instance of the order of 200 meters/sec. and the point of liquefaction of the said gas being very low such as air reduced to a very low temperature, for instance —200° C.

Owing to the very minute size of the particles the liquid or gas introduced is forming instantaneously a dispersion of microscopic ice pellets; an immediate equilibrium of temperature takes place between the said pellets or between the impalpable particles of metal and the carrier gas at a very low temperature. By reducing and purifying this gas through any known means (gravity, electrostatically, etc.) a powdered mass is obtained which constitutes the desired cryophorous mass.

One can also cause a deposit of this powdered mass on the foodstuff to be precongealed or congealed; in order to form very rapidly the shell or envelope constituting a stored refrigerant according to the above mentioned French patents.

In order to obtain a continuous production of this cryophorous mass it is advantageous to lead the reduced gas back to the starting point of the cycle or circuit at which said gas assumed again its original temperature and pressure.

In the particular case considered above, the apparatus for obtaining cryophorous masses, is characterized by the fact that it comprises essentially a compressed gas engine, for instance a turbine, performing a certain work and an atomizing injector which supplies the atomized product in the expanded and cooled gas coming out from the motor and furthermore a heat exchanger to cool the gas under pressure at the admission to the turbine by means of the gas from the exhaust, a dust precipitating device to extract the last remaining particles from the gas, a compressor (for instance a centrifugal compressor) driven by the turbine, to compress the thus obtained purified gas, a compressor to bring the expanded air back to its initial pressure and to reintroduce it at the starting point of the circuit or cycle.

By way of example such as apparatus is described hereunder and shown diagrammatically on the attached drawing.

This apparatus comprises a heat exchanger with a circuit 1 for cooled air to be supplied to a turbine 2 whose exhaust conduit 3 is equipped with an injector 4 for the introduction of a suitable liquid, said conduit communicating with a chamber 5 which contains the foodstuff to be wrapped up or enveloped according to the invention; the decantation compartment 6 of the said chamber is followed by a dust precipitator 7 and a compressor 8 driven by the turbine 2; the exhaust of the compressor 8 leads to the second circuit 9 of the heat exchanger.

The piping 10 fitted with taps 11 and 12 effectuates a direct communication of compressor 8 with turbine 2.

A tap 13 is provided for gas inlet in the decantation compartment 6 of chamber 5 and a tap 14 for a gas outlet is provided behind compressor 8.

The shaft of turbine 2 is coupled for driving a dynamo 15.

This apparatus operates as follows:

First of all the gas employed is brought down to the required temperature which may, for instance, drop down to —200° C.

To this end, one establishes a direct communication between turbine 2 and compressor 8 through piping 10 and some gas stored and compressed in an auxiliary outer compressor 16 is supplied to turbine 2; this gas expands in the turbine and drives compressor 8 and through it dynamo 15 whereby said gas cools down. Compressor 8 brings this gas to a first level of higher pressure and the outer compressor 16 changes the gas again to its original pressure; the gas is cooled down in the heat exchanger 9 through its contact with the gas coming from compressor 8. After a certain time while this cycle of successive operation is maintained, the air coming out of turbine 2 is at the required temperature.

One can then start to produce the cryophorous mass.

The direct communication through pipe 10 is cut off and the gas is directed into the chamber 5 for treating the foodstuffs while at the same time liquid is introduced into said chamber through the injector 4.

Due to the high speed of the gas, the liquid introduced is immediately atomized in very fine particles of the order of a micron. Owing to the very low temperature of the gas, the particles form immediately microscopic spherical ice pellets at a very low temperature.

Those pellets have an excellent thermal conductivity. They are well insulated by an absorbed layer of dry gas and are charged electrically. The flux of gas whose function is to disperse those particles is homogeneous and travels without friction against the walls which may carry an electrical charge of the same sign.

In the treating chamber 5, said microscopic ice pellets deposit on and envelope the foodstuff to form there on a shell according to the invention. The gas coming out from the decantation compartment is freed from its last remaining particles by means of the centrifugal dust extractor 7 and completely purified. It passes then through compressor 8, conduit of the heat exchanger 9, and outer compressor 16 to be led back to the inlet of turbine 2 at its original pressure and temperature. The inlet and outlet gas valves 13—14 are used for adjusting the volume of gas in the circuit. Microscopic ice pellets collected in the dust extractor 7 are sent to a chamber 17 and may be used for cooling a fluid for any desired use.

It is quite evident that the principle of the invention which consists in bringing very rapidly a powdered mass to any desired temperature by dispersing it in a carrier fluid having the temperature required for that purpose, may be applied for producing thermophorous as well as cryophorous masses and can for instance be used for the thermal treatment of metal pieces.

Having thus described the invention, what is claimed as new and desired to be secured by Letters Patent, is:

1. A device for the manufacture of a granular mass at a low temperature ranging from about —70° to about —200° C. and consisting of individual Dry Ice particles of a diameter of about one micron, comprising a main gas compressor driven by a motor and provided with known means for picking up the heat produced by the said compression, a turbine supplied by the said compressor and provided with blades in which the gas expands while lowering its temperature and producing work, an outlet volute at the discharge side of the turbine, a nozzle in the said volute in which the gas attains its lowest temperature and its highest speed, an injector in the volute for introducing in the gaseous stream a substance for forming the Dry Ice particles—the said substance forming instantaneously in the stream a stable suspension of minute solid and dried particles drawn along with it—a conduit for the flow of said suspension, a chamber into which leads the said conduit and in which the particles are removed from the stream, a return pipe for the flow of said stream substantially free from such particles, an auxiliary compressor supplied by the stream flowing through the return pipe and supplying the said main compressor, and a heat exchanger inserted between the main compressor, the turbine, and the auxiliary compressor and arranged to be traversed in counter currents by the gaseous stream supplied by the auxiliary compressor to the main compressor and by the compressed air supplied by the main compressor to the turbine.

2. A device according to claim 1 further comprising a by-pass pipe inserted between the volute and the supply side of the auxiliary compressor, and having valve means adapted to short-circuit the said chamber during the starting period.

3. A device according to claim 1 further comprising inserted between said chamber and the supply side of the auxiliary compressor a dedusting chamber adapted to remove from the gaseous stream leaving the first said chamber, the particles it draws along.

PIERRE GUILLAUME MANUEL BARRIS.

REFERENCES CITED

The following references are of record in the file of this patent:

UNITED STATES PATENTS

| Number | Name | Date |
|---|---|---|
| 684,385 | Sanders | Oct. 8, 1901 |
| 1,104,920 | Osbourne | July 28, 1914 |
| 1,636,345 | Willson | July 19, 1927 |
| 1,927,175 | Josephson | Sept. 19, 1933 |
| 1,933,257 | Goosmann | Oct. 31, 1933 |
| 1,970,437 | Snitkin | Aug. 14, 1934 |

FOREIGN PATENTS

| Number | Country | Date |
|---|---|---|
| 557,344 | Germany | Aug. 22, 1932 |